(12) United States Patent
Kim (10) Patent No.: US 11,853,189 B2
(45) Date of Patent: Dec. 26, 2023

(54) APPARATUS AND METHOD FOR PROVIDING ERROR INFORMATION USING GRAPHICAL USER INTERFACE

(71) Applicant: Byong Min Kim, Seoul (KR)

(72) Inventor: Byong Min Kim, Seoul (KR)

( * ) Notice: Subject to any disclaimer, the term of this patent is extended or adjusted under 35 U.S.C. 154(b) by 226 days.

(21) Appl. No.: 17/548,723

(22) Filed: Dec. 13, 2021

(65) Prior Publication Data

US 2023/0185689 A1 Jun. 15, 2023

(51) Int. Cl.
*G06F 11/00* (2006.01)
*G06F 11/32* (2006.01)
*H04L 67/02* (2022.01)
*G06F 3/04842* (2022.01)
*G06F 11/36* (2006.01)

(52) U.S. Cl.
CPC ........ *G06F 11/328* (2013.01); *G06F 3/04842* (2013.01); *G06F 11/362* (2013.01); *G06F 11/366* (2013.01); *H04L 67/02* (2013.01)

(58) Field of Classification Search
CPC .... G06F 11/327; G06F 11/328; G06F 11/362; G06F 11/366
See application file for complete search history.

(56) References Cited

U.S. PATENT DOCUMENTS

| 8,677,188 | B2 | 3/2014 | Eickmeyer et al. | |
|---|---|---|---|---|
| 9,009,544 | B2 * | 4/2015 | Cook | G06F 11/079 714/48 |
| 2002/0038388 | A1 * | 3/2002 | Netter | G06F 9/45512 719/318 |
| 2020/0174874 | A1 | 6/2020 | Yamada | |

FOREIGN PATENT DOCUMENTS

| JP | 2003186704 A | 7/2003 |
|---|---|---|
| JP | 2020087245 A | 6/2020 |
| KR | 20150099345 A | 8/2015 |

OTHER PUBLICATIONS

Burg et al., Interactive record/replay for web application debugging:, 2013, In Proceedings of the 26th annual ACM symposium on User interface software and technology (UIST '13). Association for Computing Machinery, New York, NY, USA, 473-484. (Year: 2013).*

* cited by examiner

*Primary Examiner* — Michael Maskulinski
(74) *Attorney, Agent, or Firm* — NKL Law; Byungwoong Park (57) ABSTRACT

Provided is a device for providing error information using a graphical user interface (GUI) includes: a communication circuit configured to communicate with a server that provides a web application; a display; a memory; and a processor. The processor is configured to: receive user information, request information, and response information of each user; to display user objects, respectively on the display so that a user related to an error of the web application is distinguished based on the user information and the response information; to display action objects on the display so that an action related to the error is distinguished based on the request information and the response information, if one of the user objects is selected; and to output error information related to the selected action object to the display based on the request information and the response information if one of the action objects is selected.

13 Claims, 11 Drawing Sheets

APPARATUS AND METHOD FOR PROVIDING ERROR INFORMATION USING GRAPHICAL USER INTERFACE

TECHNICAL FIELD

Embodiments disclosed in this document relate to a device and method for providing error information of a web application.

BACKGROUND

A web application is a program to be executed based on a web and means an application program that is stored in a server and that may be used through a browser interface. The web application may be included in, for example, a website or a native application. Web applications may be produced to provide various services. In order to produce a web application, it is essential to correct numerous errors, and is required to continuously correct errors even during operation after production.

In order to correct an error that has occurred in the web application, a web application developer may need to analyze a log related to the error recorded in a server. Developers may need to analyze the error log to find a part related to the error in the web application, and to repeatedly perform a task of correcting the error that has occurred in the found part.

However, when a customer's complaint due to an error is received, communication between the customer, a receiver, and a developer may be difficult. Thereby, because an amount of logs in which the developer needs to check in order to directly determine a cause of the error is excessively large, the time required for the developer to correct the error may be excessively long. Further, even though the developer spends a lot of time, there may be situations in which the developer does not find errors. When errors are not corrected promptly, the completion of the web application may be delayed during development, and it may cause great inconvenience to customers who use the web application for a long time during operation. As the time in which the developer spends on error correction increases, the time devoted to improving the performance of the web application may decrease and thus there may be a problem that a quality of the web application is deteriorated.

SUMMARY

Embodiments of the present disclosure provide a device and method in which a web application developer can conveniently and quickly determine a cause of an error that has occurred in a web application.

In an aspect, a device for providing error information using a graphical user interface (GUI) includes a communication circuit configured to communicate with a server that provides a web application; a display; a memory; and a processor electrically connected to the communication circuit, the display, and the memory, wherein the processor is configured to receive user information, request information, and response information of each of a plurality of users accessing the web application from the server using the communication circuit, to display a plurality of user objects corresponding to the plurality of users, respectively on the display so that a user related to an error of the web application among the plurality of users is distinguished based on the user information and the response information, to display a plurality of action objects corresponding to a plurality of actions, respectively generated in the web application by a user corresponding to the selected user object based on the request information and the response information on the display so that an action related to the error among the plurality of actions is distinguished, if one of the plurality of user objects is selected, and to output error information related to the selected action object to the display based on the request information and the response information if one of the plurality of action objects is selected.

BRIEF DESCRIPTION OF THE DRAWINGS

In connection with the description of the drawings, the same or similar reference numerals may be used for the same or similar components.

DETAILED DESCRIPTION

Hereinafter, some embodiments of the present disclosure will be described in detail with reference to exemplary drawings. However, this is not intended to limit the present disclosure to specific embodiments, and it should be understood that various modifications, equivalents or substitutions of the embodiments of the present disclosure are included. In adding reference numerals to components of each drawing, it should be noted that the same reference numerals are given to the same components as much as possible even though they are indicated on different drawings. Further, in the description of the embodiment of the present disclosure, when it is determined that a detailed description of a related known configuration or function interferes with the understanding of the embodiment of the present disclosure, a detailed description thereof will be omitted.

Figure 1:
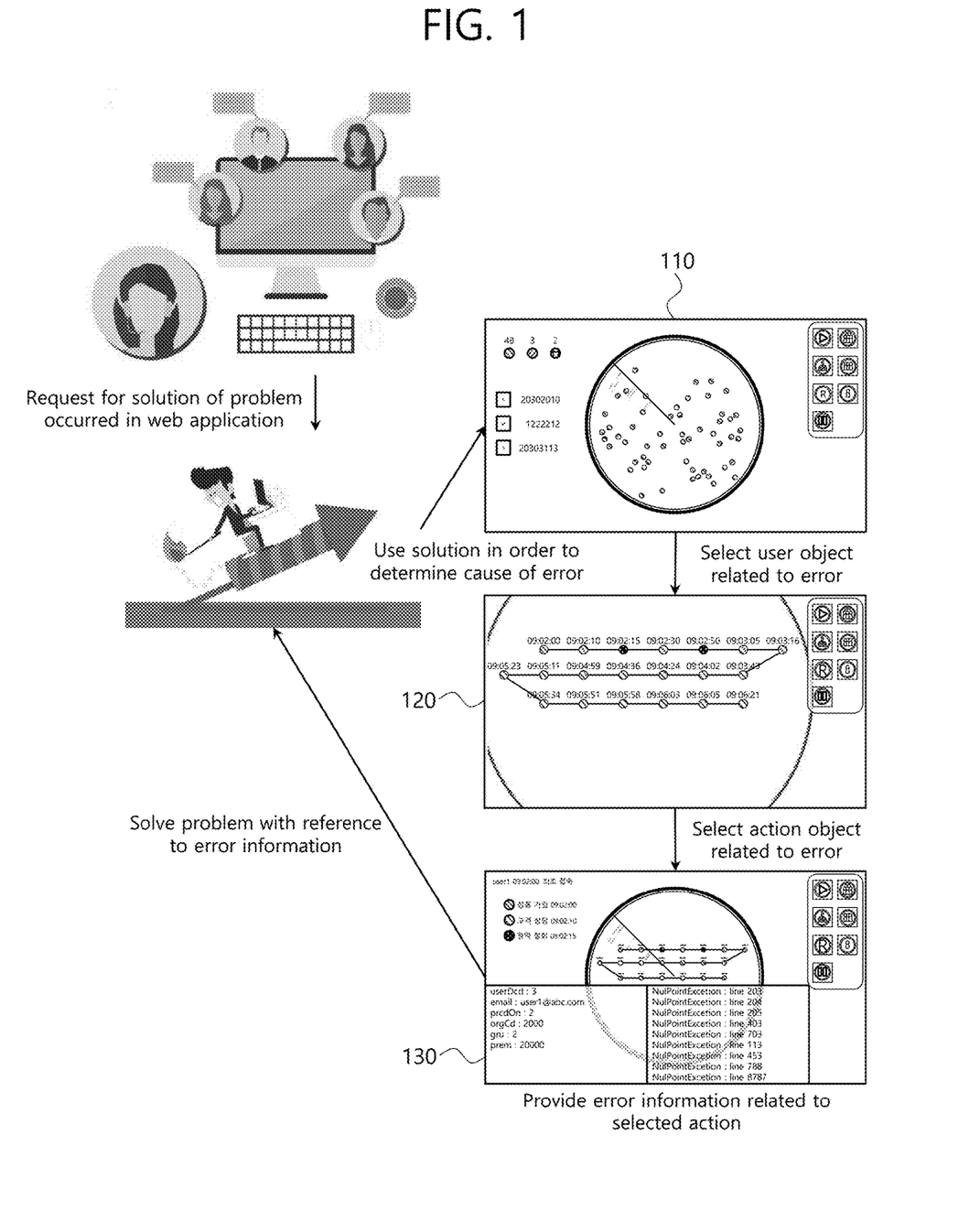
FIG. 1 illustrates an operating environment of an error information providing device using a GUI according to an embodiment.

FIG. 1 illustrates an operating environment of an error information providing device using a GUI according to an embodiment.

Referring to FIG. 1, a web application may be used by plurality of users. The web application may include various errors. For example, various errors such as a registration procedure, an authentication procedure, login, or payment may occur. A user of the web application may request a web application provider to solve a problem occurring in the web application.

The web application provider may analyze a cause of an error in order to solve the problem. In general, in order to determine the cause of the error, it is necessary to analyze a log stored in the server. However, because an amount of logs that the web application provider needs to check to determine the cause of the error is very large, it may take an excessive amount of time to determine the cause. The error information providing device according to an embodiment may be used as a solution for determining a cause of an error by a provider of a web application.

The error information providing device according to an embodiment may display a user object corresponding to users of the web application on a first screen 110. The user object may be displayed to be distinguishable by a user related to the error. The provider of the web application may select a user object represented as being related to an error on the first screen 110.

When a user object related to an error is selected, the error information providing device may display an action object corresponding to actions generated in the web application selected by the user on a second screen 120. The action object may be displayed to distinguish an action related to an error. The provider of the web application may select an action object represented as being related to an error on the second screen 120.

When an action object related to an error is selected, the error information providing device may provide error information related to a selected action on a third screen 130. The error information may include information that may determine a cause and location of the error. The provider of the web application may solve a problem experienced by the user of the web application with reference to the error information provided on the third screen 130.

Figure 2:
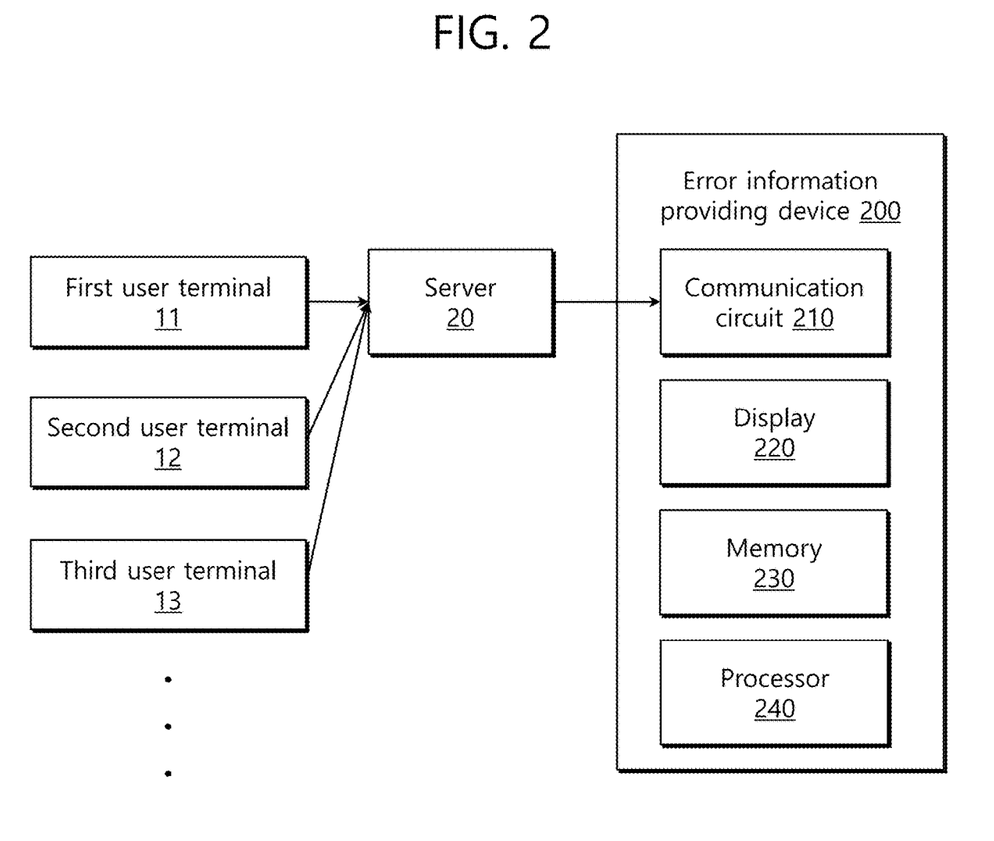
FIG. 2 is a block diagram illustrating a configuration of an error information providing device using a GUI according to an embodiment.

FIG. 2 is a block diagram illustrating a configuration of an error information providing device using a GUI according to an embodiment.

Referring to FIG. 2, an error information providing device 200 according to an embodiment may be implemented into, for example, a user terminal such as a desktop personal computer (PC), a laptop PC, a tablet PC, or a mobile phone. The error information providing device 200 may include a communication circuit 210, a display 220, a memory 230, and a processor 240.

The communication circuit 210 may be configured to communicate with the outside. The communication circuit 210 may include a wireless communication interface and/or a wired communication interface. For example, the communication circuit 210 may transmit and receive data to and from an external device such as a user terminal and/or another external server. According to an embodiment, the communication circuit 210 may be configured to communicate with a server 20 that provides a web application.

The display 220 may output visual information. The display 220 may be one of various types of visual output devices such as a liquid crystal display (LCD), a light emitting diode (LED), a quantum light emitting diode (QLED), or an organic light emitting diode (OLED). As illustrated in FIG. 2, the display 220 may be included in the error information providing device 200, but may be functionally connected to the error information providing device 200 as an external device.

The memory 230 may include a volatile memory and/or a non-volatile memory. The memory 230 may store various data handled by the error information providing device 200. For example, the memory 230 may store data received from a user terminal and/or an external server, and store data processed inside the error information providing device 200.

The processor 240 may be electrically connected to the communication circuit 210, the display 220, and the memory 230. The processor 240 may control the communication circuit 210 and the memory 230, and perform various data processing and operations. By executing software or instructions stored in the memory 230, the processor 240 may perform the following operations.

According to an embodiment, the processor 240 may receive user information, request information, and response information of each of a plurality of users accessing the web application from the server 20 using the communication circuit 210. A first user terminal 11, a second user terminal 12, and a third user terminal 13 may access the server 20 to use a web application provided by the server 20. Although three user terminals 11, 12, and 13 are illustrated in FIG. 1, the present disclosure is not limited thereto, and any number of user terminals may be accessed to the server 20. The server 20 may store user information corresponding to each of the user terminals 11, 12, and 13, information on a request received from each of the user terminals 11, 12, and 13, and information on a response transmitted from each of the user terminals 11, 12, and 13. The processor 240 may receive user information, request information, and response information related to each of the user terminals 11, 12, and 13 from the server 20 using the communication circuit 210. The user information may include identification information capable of identifying the user. The request information may include information on a time in which a request is generated by a user and information on the content of the generated request. The response information may include information (e.g., error log) related to an error. The processor 240 may store the received information in the memory 230.

According to an embodiment, the processor 240 may display a plurality of user objects corresponding to the plurality of users, respectively on the display 220 so that a user related to the error of the web application among the plurality of users distinguishes the plurality of user objects based on the user information and the response information. The processor 240 may analyze the user information to recognize a user who uses the web application provided by the server 20. The processor 240 may display a plurality of user objects in a partial area of a screen output by the display 220 based on user information. For example, the plurality of user objects may be arranged at arbitrary positions within a partial area of the output screen. As another example, the plurality of user objects may be arranged in order of the user's initial access time corresponding to each thereof. An arrangement method of the user object may be switched by changing a display mode. The user object may be provided in various forms, such as a circular, triangular, or square icon.

The processor 240 may analyze an error log included in the response information to identify a user related to the error. According to an embodiment, a user object corresponding to a user related to an error among a plurality of users may be displayed differently from a user object corresponding to the remaining users not related to an error in a shape, color, or pattern. For example, a user object of a user related to an error may be provided in red, and a user object of a user not related to an error may be provided in blue or green. Accordingly, a user related to an error among a plurality of users may be easily determined.

According to an embodiment, a user object corresponding to a logged-in user among a plurality of users may be displayed differently from a user object corresponding to the other non-logged-in users in a shape, color, or pattern. For example, a user object of a logged-in user may be displayed in green, and a user object of a user who is not logged in may be displayed in blue. Accordingly, a user who has encountered a problem due to login authentication may be easily determined.

According to an embodiment, when one of the plurality of user objects is selected, the processor 240 may display, on the display 220, a plurality of action objects corresponding to each of the plurality of actions generated in the web application by the user corresponding to the user object selected based on the request information and the response information so that an action related to an error among the plurality of actions may be distinguished. The processor 240 may receive an input to one of a plurality of user objects through an input device (e.g., keyboard, mouse, or touch panel) electrically connected thereto. The processor 240 may analyze the request information to recognize an action generated by the selected user. The processor 240 may display a history of actions generated by the user selected through the action object. The processor 240 may display a plurality of action objects in a partial area of the screen output by the display 220. For example, the plurality of action objects may be arranged in order of time in which an action corresponding to each thereof is generated. The action object may be arranged in various shapes such as a linear, spiral, or radial shape according to a time in which the action is generated. The action object may be provided in various forms, such as a circle, a triangle, or a rectangle.

The processor 240 may analyze an error log included in the response information to identify an action related to the error. According to an embodiment, an action object corresponding to an action related to an error among a plurality of actions may be displayed differently from an action object corresponding to the remaining actions not related to an error. For example, an action object corresponding to an action related to an error may be provided in red, and an action object corresponding to an action not related to an error may be provided in blue. Accordingly, an action related to an error among a plurality of actions of the user may be easily determined.

According to an embodiment, when one of the plurality of action objects is selected, the processor 240 may output error information related to the selected action object on the display 220 based on the request information and the response information. The processor 240 may receive an input to one of a plurality of action objects through an input device. The processor 240 may analyze the request information to recognize information on the selected action, and analyze the response information to recognize an error related to the selected action. For example, the processor 240 may output information on a user who generated the action, information on the content of the action, and information on a location of an error related to the action. A provider of the web application (i.e., the user of the error information providing device 200) may easily and quickly determine a cause of the error using the output error information and correct the error.

According to an embodiment, the processor 240 may receive information related to a load of each hardware (or component) included in the server 20 from the server 20 using the communication circuit 210, and display information related to the load on the display 220. For example, the processor 240 may receive information on a load applied to a central processing unit (CPU), memory, and/or storage included in the server 20. By displaying the load information, when an error occurs due to a load applied to the server 20, the web application provider may easily determine it.

According to an embodiment, the processor 240 may send a guide message (e.g., short message service (SMS), multimedia messaging service (MMS), push notification, and/or messenger message) to the user terminals 11, 12, and/or 13 of the user related to the error using the communication circuit 210. The user related to the error may immediately recognize occurrence of the error through the guide message, and transmit an error response request to the provider of the web application.

According to an embodiment, the processor 240 may add a guide message to an error-related portion of the web application using the communication circuit 210. For example, when a user accesses a page related to an error in the web application, the processor 240 may add a pop-up for notifying a system check to the page related to the error. Accordingly, when the user accesses the page in which the error has occurred, the user can immediately recognize the fact that the error has occurred.

Figure 3:
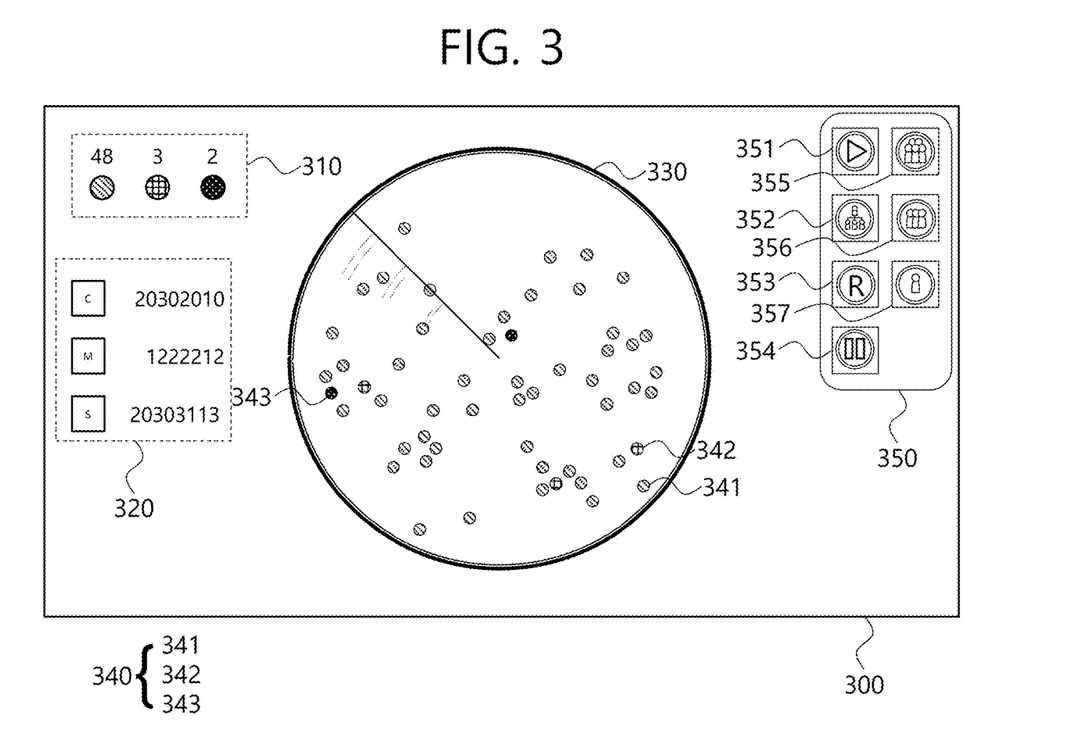
FIG. 3 illustrates an exemplary screen provided by an error information providing device using a GUI according to an embodiment.

FIG. 3 illustrates an exemplary screen provided by an error information providing device using a GUI according to an embodiment.

Referring to FIG. 3, the error information providing device according to an embodiment may provide a screen 300 including a user object 340 and the like using a display.

According to an embodiment, the error information providing device may display statistics related to a user in a first area 310. For example, the error information providing device may display the number (e.g., 48) of non-logged-in user objects without errors, the number (e.g., 3) of logged-in user objects without errors, and the number (e.g., 2) of user objects related to errors.

According to an embodiment, the error information providing device may display information on a load of each hardware included in a server in a second area 320. For example, the error information providing device may display a load (e.g., 20302010) applied to a CPU, a load (e.g., 1222212) applied to a memory, and a load (e.g., 20303113) applied to a storage.

According to an embodiment, the error information providing device may display a user object 340 representing a user of a web application in a user object display area 330. The user object display area 330 may be represented in the form of a circular radar image.

The user object 340 may be represented as a circular object. The user object 340 may be displayed at any position within the user object display area 330. The user object 340 may correspond to each of all users who are using the web application. The user object 340 may include a first user object 341 corresponding to an a non-logged-in user without errors, a second user object 342 corresponding to a logged-in user without errors, and a third user object 343 corresponding to an error related user. The first user object 341, the second user object 342, and the third user object 343 may be respectively represented in different colors. For example, the first user object 341 may be displayed in blue, the second user object 342 may be displayed in green, and the third user object 343 may be displayed in red. Accordingly, the user related to the error can be easily and quickly determined. Although not illustrated in FIG. 3, a user's initial access time and/or user identification information (obtained from request information) corresponding to each of the user objects 340 may be displayed around each of the user objects 340.

A menu 350 may include software buttons that perform various functions. A first button 351 may be a button for starting detection of a user using a web application. A second button 352 may be a button for arranging and displaying the user object 340 in order of the user's initial access time. A third button 353 may be a button for resuming detection of a user using a web application. A fourth button 354 may be a button for stopping detection of a user using a web application. A fifth button 355 may be a button for displaying all users who use the web application, as illustrated in FIG. 3. A sixth button 356 may be a button for displaying pre-registered testers and developers among users using the web application. A screen output in response to an input to the sixth button 356 will be described in detail with reference to FIG. 6. A seventh button 357 may be a button for displaying a developer registered in advance among users using the web application. A screen output in response to an input to the seventh button 357 will be described in detail with reference to FIG. 7. By using the fifth button 355, the sixth button 356, and the seventh button 357, mixed server logs of a plurality of users may be arranged and output for each selected user.

Figure 4:
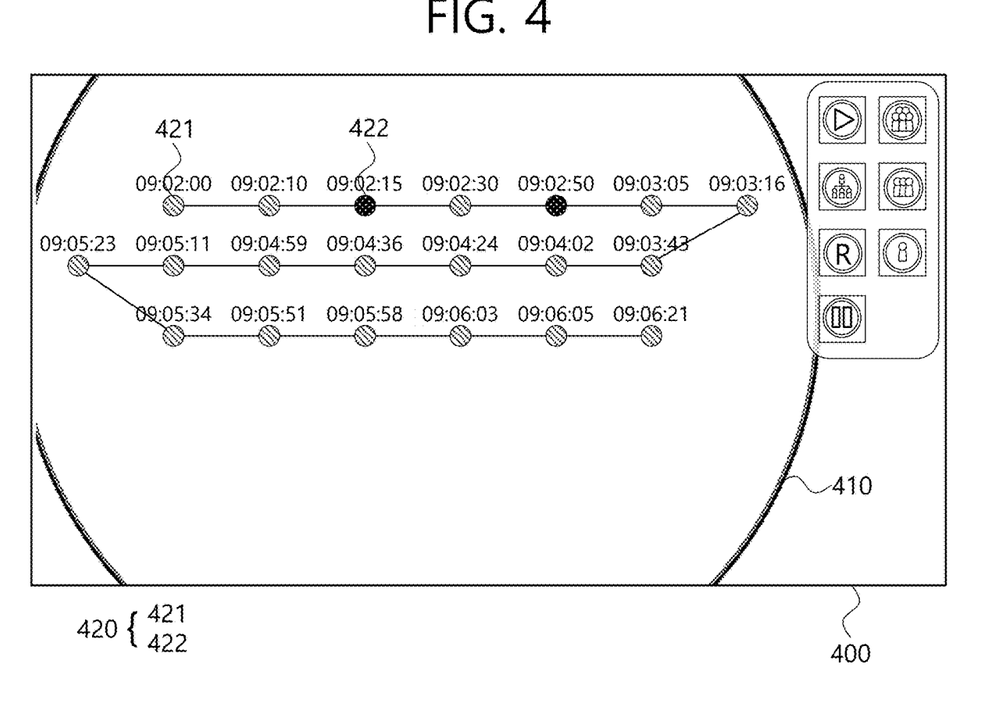
FIG. 4 illustrates an exemplary screen provided by an error information providing device using a GUI according to an embodiment.

FIG. 4 illustrates an exemplary screen provided by an error information providing device using a GUI according to an embodiment.

Referring to FIG. 4, when an input to the third user object 343 illustrated in FIG. 3 is received, the error information providing device according to an embodiment may provide a screen 400 including an action object 420 or the like using a display. FIG. 4 illustrates a case in which a user related to an error is selected, but the present disclosure is not limited thereto, and the error information providing device may provide a screen similar to that illustrated in FIG. 4 in response to an input to the first user object 341 and the second user object 342. For convenience of description, a description of duplicate elements will be omitted.

According to an embodiment, the error information providing device may display the action object 420 in an action object display area 410. The action object display area 410 may be represented similarly to the user object display area of FIG. 3. The action object display area 410 may be enlarged (or reduced) and displayed, as illustrated in FIG. 4 according to an input of a user (e.g., developer) of the error information providing device.

The action object 420 may correspond to each of all actions performed by the user corresponding to the selected third user object 343 in the web application. The action object 420 may be represented as a circular object. The action objects 420 may be arranged and displayed in the action object display area 410 in order of times in which actions has occurred. For example, the action objects 420 may be linearly arranged in order of times in which actions are generated, and one action object may be connected to a previous action object and a next action object by a line in order of occurrence times. Because the action objects 420 are connected by a line, the order of occurrence of the action may be clearly represented.

The action object 420 may include a first action object 421 corresponding to an action not related to an error and a second action object 422 corresponding to an action related to an error. The first action object 421 and the second action object 422 may be respectively represented in different colors. For example, the first action object 421 may be displayed in blue, and the second action object 422 may be displayed in red. Accordingly, an action related to the error can be easily and quickly determined. As illustrated in FIG. 4, an action occurrence time (obtained from request information) corresponding to each of the action objects 420 may be displayed around each of the action objects 420.

Figure 5:
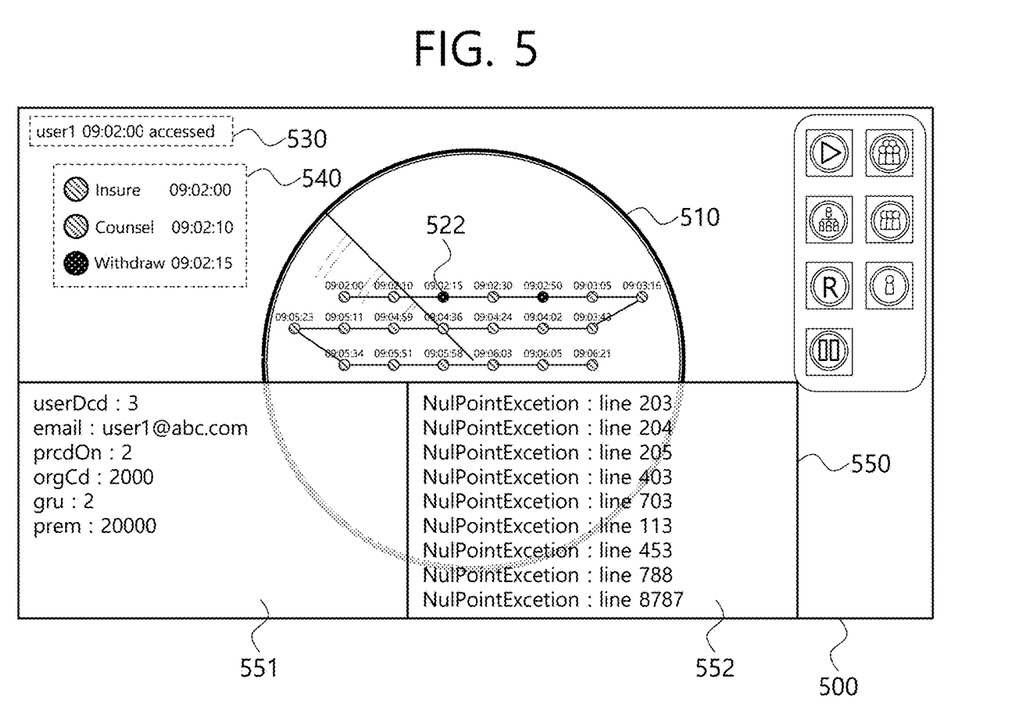
FIG. 5 illustrates an exemplary screen provided by an error information providing device using a GUI according to an embodiment.

FIG. 5 illustrates an exemplary screen provided by an error information providing device using a GUI according to an embodiment.

Referring to FIG. 5, when an input to the second action object 422 illustrated in FIG. 4 is received, the error information providing device according to an embodiment may provide a screen 500 including error information 550 and the like using a display. FIG. 5 illustrates a case in which an action related to an error is selected, but the present disclosure is not limited thereto, and the error information providing device may provide a screen similar to that illustrated in FIG. 5 in response to an input to the first action object 421. For convenience of description, a description of duplicate elements will be omitted.

According to an embodiment, the error information providing device may display an action object 522 in an action object display area 510. The action object 522 may correspond to the second action object 422 of FIG. 4.

The error information providing device may display the user's identification information and initial access time information corresponding to the action object 522 in a first area 530. The error information providing device may display content information and occurrence time information of an action corresponding to each action object in a second area 540. Information displayed on the first area 530 and the second area 540 may be displayed on the screen 400 illustrated in FIG. 4.

The error information providing device may display error information 550 corresponding to the action object 522 at the bottom of the screen 500. The error information 550 may include action information 551 and error location information 552. The action information 551 may be obtained from request information of an action corresponding to the action object 522. The action information 551 may include information on a user generated an action and information on the content of the action. The error location information 552 may be obtained from response information of an action corresponding to the action object 522. The error location information 552 may include information on a portion (e.g., line 203, line 204, and line 205) in which an error occurs in the web application.

Figure 6:
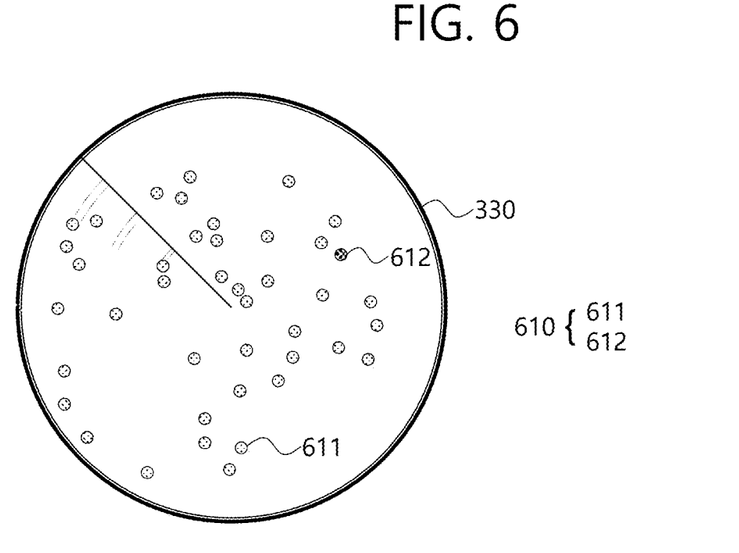
FIG. 6 illustrates an exemplary screen provided by an error information providing device using a GUI according to an embodiment.

FIG. 6 illustrates an exemplary screen provided by an error information providing device using a GUI according to an embodiment.

According to an embodiment, the error information providing device may display a plurality of user objects on the display so that pre-registered users among the plurality of users distinguish the plurality of user objects.

Referring to FIG. 6, an error information providing device according to an embodiment may display a user object 610 in a user object display area 330 using a display. For example, in response to an input to the sixth button 356 of FIG. 3, the error information providing device may display the user object 610 corresponding to a pre-registered tester and developer.

A tester and developer of the web application may be registered in advance in the error information providing device. The error information providing device may distinguish a tester and a developer among users accessing to the web application based on previously stored information. The error information providing device may display the user object 610 corresponding to the distinguished tester and developer. The user object 610 may include a fourth user object 611 corresponding to the tester and a fifth user object 612 corresponding to the developer. The fourth user object 611 and the fifth user object 612 may be respectively represented in different colors. For example, the fourth user object 611 may be displayed in yellow green, and the fifth user object 612 may be displayed in orange. Accordingly, a situation of the user corresponding to the tester and the developer may be easily and quickly determined. Although not illustrated in FIG. 6, an initial access time and/or user identification information of the tester or the developer corresponding to each of the user objects 610 may be displayed around each of the user objects 610.

Figure 7:
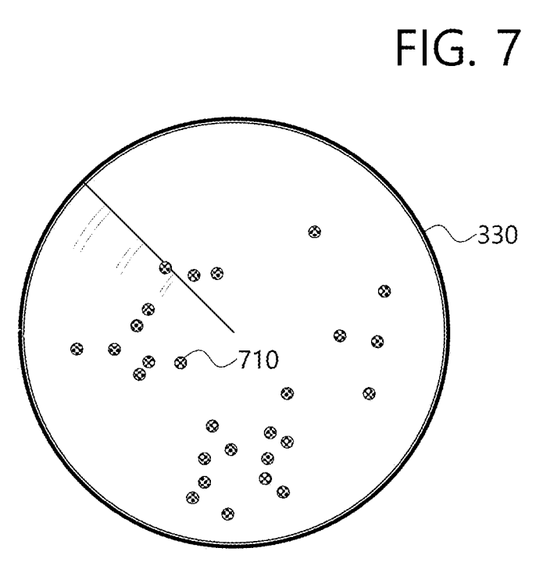
FIG. 7 illustrates an exemplary screen provided by an error information providing device using a GUI according to an embodiment.

FIG. 7 illustrates an exemplary screen provided by an error information providing device using a GUI according to an embodiment.

According to an embodiment, the error information providing device may display a plurality of user objects on the display so that pre-registered users among the plurality of users distinguish the plurality of user objects.

Referring to FIG. 7, an error information providing device according to an embodiment may display a user object 710 in a user object display area 330 using a display. For example, in response to an input to the seventh button 357 of FIG. 3, the error information providing device may display the user object 710 corresponding to a pre-registered developer.

The developer of the web application may be registered in advance in the error information providing device. The error information providing device may identify a developer among users accessing the web application based on previously stored information. The error information providing device may display the user object 710 corresponding to the identified developer. Accordingly, a situation of the user corresponding to the developer can be easily and quickly determined. Although not illustrated in FIG. 7, the developer's initial access time and/or user identification information corresponding to each of the user objects 710 may be displayed around each of the user objects 710.

Figure 8:
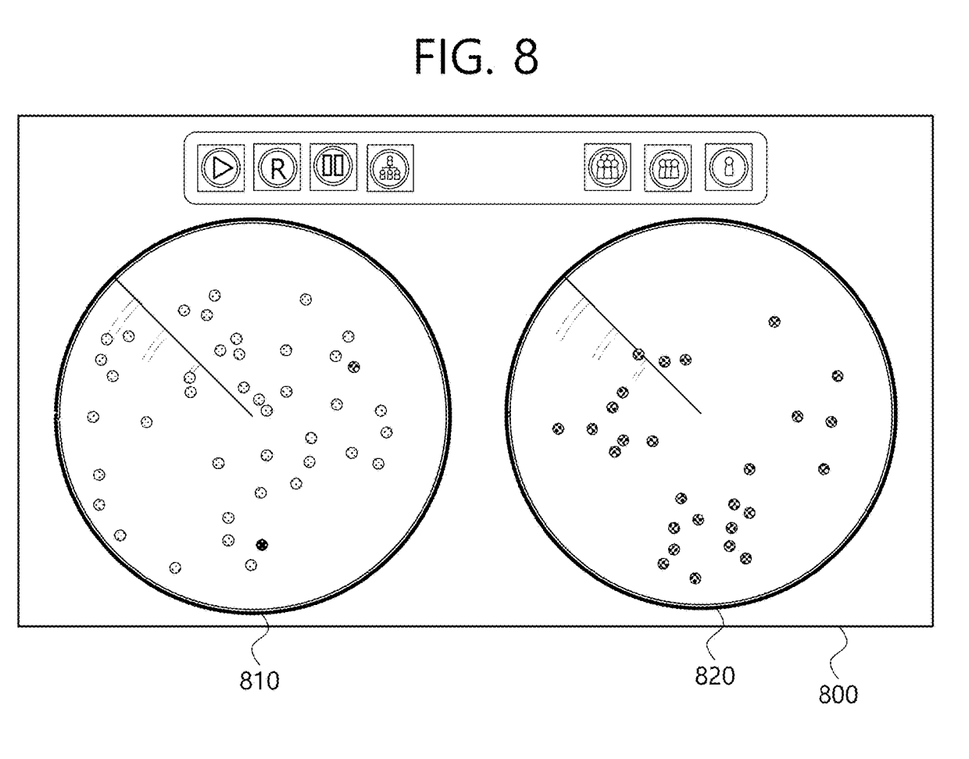
FIG. 8 illustrates an exemplary screen provided by an error information providing device using a GUI according to an embodiment.

FIG. 8 illustrates an exemplary screen provided by an error information providing device using a GUI according to an embodiment.

Referring to FIG. 8, an error information providing device according to an embodiment may provide a screen 800 including two object display areas 810 and 820 using a display.

A first display area 810 may display a user object corresponding to a user (e.g., tester and developer) accessing a verification server of the web application. A second display area 820 may display a user object corresponding to a user (e.g., developer) accessing a web application development server. In a development step of the web application, the development server and the verification server may provide different results regarding errors. For example, in a specific portion of a web application, an error may occur in only one of the development server and the verification server. This is caused by data migration or revision operations, in which case, it may be more difficult to find a portion in which an error has occurred. By simultaneously displaying an error occurrence state of the user accessing the verification server and an error occurrence state of the user accessing the development server in each of the first display area 810 and the second display area 820, the cause of the error can be easily and quickly determined in the verification server or the development server.

Figure 9:
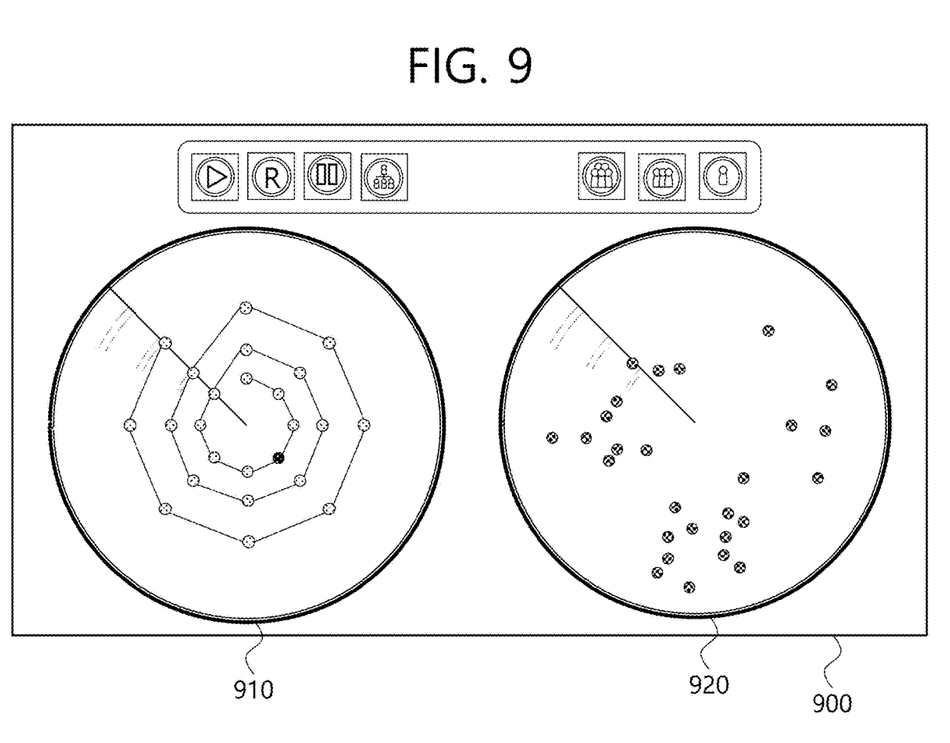
FIG. 9 illustrates an exemplary screen provided by an error information providing device using a GUI according to an embodiment.

FIG. 9 illustrates an exemplary screen provided by an error information providing device using a GUI according to an embodiment.

Referring to FIG. 9, when an input to one of the user objects displayed on the first display area 810 of FIG. 8 is received, the error information providing device according to an embodiment may provide a screen 900 including two object display areas 910 and 920 using the display. A first display area 910 may correspond to the first display area 810 of FIG. 8, and a second display area 920 may correspond to the second display area 820 of FIG. 8. For convenience of description, a description of duplicate elements will be omitted.

According to an embodiment, the error information providing device may display an action object corresponding to an action performed by a user corresponding to the selected user object in the web application in the first display area 910. In the first display area 910, the action objects may be spirally arranged in order of a time in which actions have occurred. One action object may be connected to a previous action object and a next action object by a line in order of occurrence time. An arrangement form of the action object may be variously modified according to circumstances, as illustrated in FIGS. 4 and 9.

Figure 10:
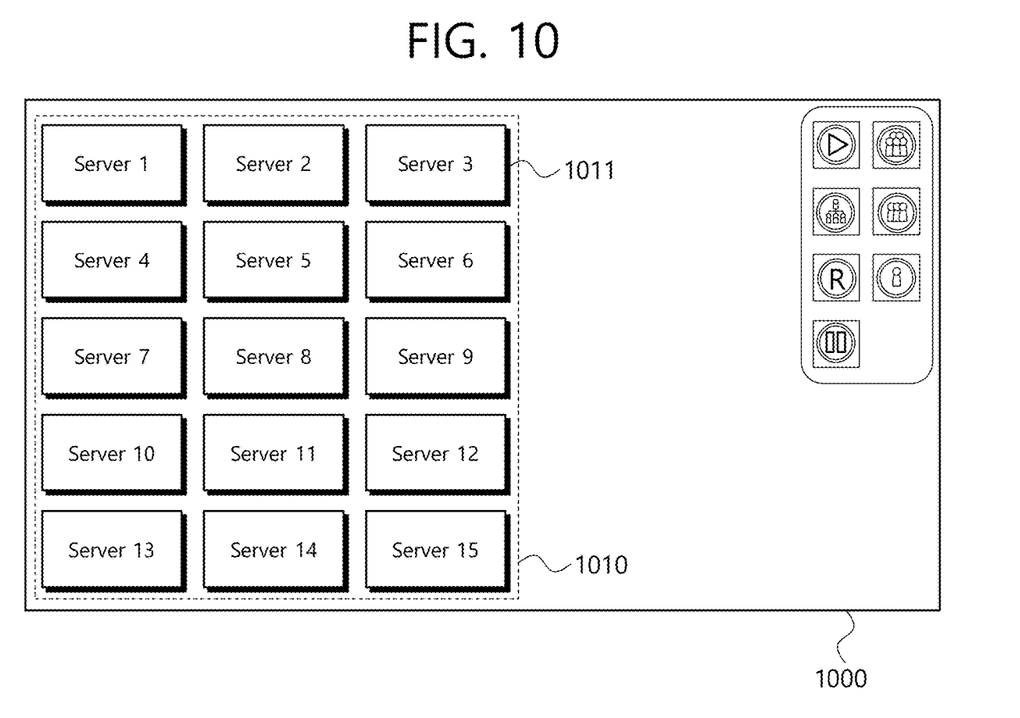
FIG. 10 illustrates an exemplary screen provided by an error information providing device using a GUI according to an embodiment.

FIG. 10 illustrates an exemplary screen provided by an error information providing device using a GUI according to an embodiment.

Referring to FIG. 10, the error information providing device according to an embodiment may display a server object 1010 corresponding to each server connectable through a communication circuit on a display. The user of the error information providing device may apply an input to one of the displayed server objects 1010. When one of the server objects 1010 is selected, the error information providing device may display a user object corresponding to a user accessing a server (e.g., third server) corresponding to the selected server object (e.g., a server 3 button 1011) on the display. When plurality of servers are linked or plurality of web applications are monitored using a single error information providing device, error-related information can be checked by easily selecting one of the plurality of servers, so that monitoring and management of the web application can be facilitated.

Figure 11:
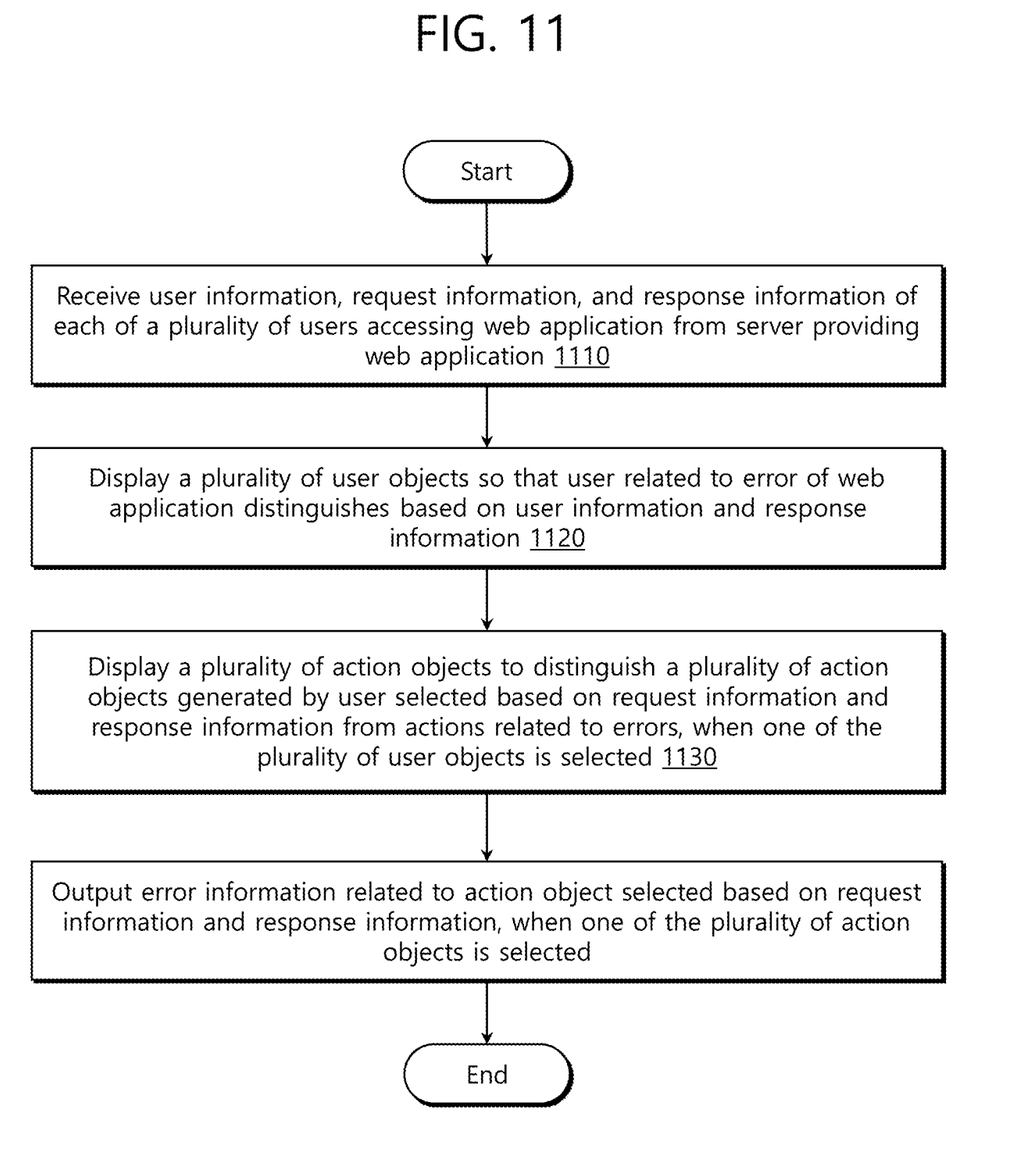
FIG. 11 is a flowchart illustrating a method of providing error information using a GUI according to an embodiment.

FIG. 11 is a flowchart illustrating a method of providing error information using a GUI according to an embodiment.

Hereinafter, it is assumed that the error information providing device of FIG. 2 performs a process of FIG. 11. Further, in the description of FIG. 11, an operation described as being performed by the error information providing device may be understood as being controlled by the processor 240.

Referring to FIG. 11, in step 1110, the device may receive user information, request information, and response information of each of a plurality of users accessing the web application from a server providing the web application.

In step 1120, the device may display a plurality of user objects so that a user related to an error of the web application distinguishes the plurality of user objects based on the user information and the response information.

In step 1130, the device may receive an input to one of a plurality of user objects, and when one of the plurality of user objects is selected, the device may display a plurality of action objects so as to distinguish a plurality of action objects generated by a user selected based on the request information and the response information from actions related to errors.

In step 1140, the device may receive an input to one of the plurality of action objects, and when one of the plurality of action objects is selected, the device may output error information related to the action object selected based on the request information and the response information.

The embodiments of this document and the terms used therein are not intended to limit the technology described in this document to a specific embodiment, but it should be understood to include various modifications, equivalents, and/or substitutions of the embodiments. In connection with the description of the drawings, like reference numerals may be used for like components. The singular expression may include the plural expression unless the context clearly dictates otherwise. In this document, expressions such as "A or B", "at least one of A and/or B", "A, B, or C", or "at least one of A, B, and/or C" may include all possible combinations of items listed together. Expressions such as "first" or "second" may modify the components regardless of order or importance, and are used only for distinguishing one component from other components, and do not limit the components. When a component is referred to as being "connected (functionally or communicatively)" or "accessed" to another component, the component may be directly connected to the other component or may be connected through the other component.

In this document, "adapted to or configured to" may be used interchangeably with, for example, "suitable for," "having the ability to," "changed to," "made to," "capable of" or "designed to" in hardware or software according to a circumstance. In some circumstances, the expression "a device configured to" may mean that the device is "capable of" with other devices or components. For example, the phrase "a processor set (or configured) to perform A, B, and C" may mean a dedicated processor (e.g., embedded processor) for performing the corresponding operations or a general-purpose processor (e.g., CPU) capable of performing corresponding operations by executing one or more programs stored in a memory device.

The term "module" used in this document includes a unit configured with hardware, software, or firmware, and may be used interchangeably with terms such as logic, a logic block, a component, or a circuit. The "module" may be an integrally formed component or a minimum unit or a portion of performing one or more functions. The "module" may be implemented mechanically or electronically, and include, for example, known or to-be developed application-specific integrated circuit (ASIC) chips, field-programmable gate arrays (FPGAs), or programmable logic devices that perform certain operations.

At least a portion of a device (e.g., modules or functions thereof) or a method (e.g., operations) according to an embodiment may be implemented into instructions stored in a computer readable storage medium in the form of a program module. When the instruction is executed by the processor, the processor may perform a function corresponding to the instruction.

Each of components (e.g., module or program module) according to an embodiment may be configured with a singular entity or a plurality of entities, and some sub-components of the aforementioned sub-components may be omitted, or other sub-components may be further included. Alternatively or additionally, some components (e.g., module or program module) may be integrated into one entity to perform the same or similar functions performed by each corresponding component before being integrated. Operations performed by a module, program module, or other component according to an embodiment may be sequentially, parallelly, repetitively, or heuristically executed, or at least some operations may be executed in different order, omitted, or other operations may be added.

According to the embodiments disclosed in this document, it is possible to immediately detect whether an error has occurred by distinguishing and visually illustrating a user related to the error of a web application.

Further, by distinguishing and visually illustrating user actions related to errors in the web application, it is possible to quickly and conveniently find the cause of the error without analyzing a log.

Further, various effects directly or indirectly identified through this document can be provided.

What is claimed is:

1. A device for providing error information using a graphical user interface (GUI), the device comprising:
   a communication circuit configured to communicate with a server that provides a web application;
   a display;
   a memory; and
   a processor electrically connected to the communication circuit, the display, and the memory,
   wherein the processor is configured to:
   receive user information, request information, and response information of each of a plurality of users accessing the web application from the server using the communication circuit,
   display a plurality of user objects corresponding to the plurality of users, respectively on the display so that a user related to an error of the web application among the plurality of users is distinguished based on the user information and the response information,
   display a plurality of action objects corresponding to a plurality of actions, respectively generated in the web application by a user corresponding to the selected user object on the display so that an action related to the error among the plurality of actions is distinguished based on the request information and the response information, if one of the plurality of user objects is selected, and
   output error information related to the selected action object on the display based on the request information and the response information if one of the plurality of action objects is selected.

2. The device of claim 1, wherein a user object corresponding to a user related to the error among the plurality of users is displayed differently from a user object corresponding to the remaining users not related to the error.

3. The device of claim 1, wherein a user object corresponding to a logged-in user among the plurality of users is displayed differently from a user object corresponding to the remaining users who are not logged in.

4. The device of claim 1, wherein an action object corresponding to an action related to the error among the plurality of actions is displayed differently from an action object corresponding to the remaining actions not related to the error.

5. The device of claim 1, wherein the plurality of user objects and the plurality of action objects are displayed in a partial area of a screen output by the display.

6. The device of claim 1, wherein the plurality of user objects are arranged in order of the user's initial access times corresponding to each of the plurality of user objects.

7. The device of claim 1, wherein the plurality of action objects are arranged in order of times in which an action corresponding to each of the plurality of action objects has occurred.

8. The device of claim 1, wherein the processor is configured to display the plurality of user objects on the display so that pre-registered users among the plurality of users is distinguished.

9. The device of claim 1, wherein the processor is configured to:
receive information related to a load of each hardware included in the server from the server using the communication circuit, and
display information related to the load on the display.

10. The device of claim 1, wherein the processor is configured to:
display a plurality of server objects corresponding to a plurality of servers, respectively connectable through the communication circuit on the display, and
display, if one of the plurality of server objects is selected, a plurality of user objects corresponding to a plurality of users, respectively accessing a server corresponding to the selected server object on the display.

11. The device of claim 1, wherein the processor is configured to send a guide message to a user terminal of a user related to the error using the communication circuit.

12. The device of claim 1, wherein the processor is configured to add a guide message to an error-related portion of the web application using the communication circuit.

13. A method of providing error information using a graphical user interface (GUI), the method comprising:
receiving user information, request information, and response information of each of a plurality of users accessing a web application from a server providing the web application;
displaying a plurality of user objects corresponding to the plurality of users, respectively so that a user related to an error of the web application among the plurality of users is distinguished based on the user information and the response information;
displaying a plurality of action objects corresponding to a plurality of actions, respectively generated in the web application by a user corresponding to the selected user object so that an action related to the error among the plurality of actions is distinguished based on the request information and the response information, if one of the plurality of user objects is selected; and
outputting error information related to the selected action object based on the request information and the response information if one of the plurality of action objects is selected.

* * * * *